US009672122B1

(12) United States Patent
Gandhi et al.

(10) Patent No.: US 9,672,122 B1
(45) Date of Patent: Jun. 6, 2017

(54) FAULT TOLERANT DISTRIBUTED TASKS USING DISTRIBUTED FILE SYSTEMS

(71) Applicant: Amazon Technologies, Inc., Reno, NV (US)

(72) Inventors: Mohana Sudhan Gandhi, Redmond, WA (US); Rejith George Joseph, Seattle, WA (US); Bandish N. Chheda, Seattle, WA (US); Saurabh Dileep Baji, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 172 days.

(21) Appl. No.: 14/500,762

(22) Filed: Sep. 29, 2014

(51) Int. Cl.
G06F 11/07 (2006.01)
G06F 11/20 (2006.01)
G06F 17/30 (2006.01)

(52) U.S. Cl.
CPC ........ G06F 11/203 (2013.01); G06F 11/2041 (2013.01); G06F 11/2048 (2013.01); G06F 17/30215 (2013.01)

(58) Field of Classification Search
CPC ................. G06F 2211/1028; G06F 11/203
USPC .................................. 714/6.24, 6.3
See application file for complete search history.

(56) References Cited

U.S. PATENT DOCUMENTS

| 7,971,015 | B2 * | 6/2011 | Waldspurger | G06F 11/1438 711/161 |
| 8,135,796 | B1 * | 3/2012 | Slaughter | G06F 9/465 709/217 |
| 2007/0094269 | A1 * | 4/2007 | Mikesell | G06F 11/1435 |
| 2009/0172191 | A1 * | 7/2009 | Dumitriu | H04L 67/1029 709/241 |
| 2009/0210431 | A1 * | 8/2009 | Marinkovic | G06F 17/302 |
| 2010/0161565 | A1 * | 6/2010 | Lee | G06F 11/1471 707/674 |
| 2011/0029930 | A1 * | 2/2011 | Watanabe | G06F 9/4843 715/846 |
| 2011/0099266 | A1 * | 4/2011 | Calder | G06F 8/65 709/224 |
| 2011/0314219 | A1 * | 12/2011 | Ulrich | G06F 3/061 711/114 |
| 2012/0036394 | A1 * | 2/2012 | Feng | G06F 11/1662 714/4.12 |
| 2012/0185437 | A1 * | 7/2012 | Pavlov | G06F 17/30094 707/652 |

(Continued)

Primary Examiner — Chae Ko
(74) Attorney, Agent, or Firm — Davis Wright Tremaine LLP

(57) ABSTRACT

Data files in a distributed system sometimes becomes unavailable. A method for fault tolerance without data loss in a distributed file system includes allocating data nodes of the distributed file system among a plurality of compute groups, replicating a data file among a subset of the plurality of the compute groups such that the data file is located in at least two compute zones, wherein the first compute zone is isolated from the second compute zone, monitoring the accessibility of the data files, and causing a distributed task requiring data in the data file to be executed by a compute instance in the subset of the plurality of the compute groups. Upon detecting a failure in the accessibility of a data node with the data file, the task management node may redistribute the distributed task among other compute instances with access to any replica of the data file.

20 Claims, 10 Drawing Sheets

(56) References Cited

U.S. PATENT DOCUMENTS

| | | | |
|---|---|---|---|
| 2012/0266044 A1* | 10/2012 | Hu | H03M 13/3761 |
| | | | 714/763 |
| 2012/0303585 A1* | 11/2012 | Zuckerman | G06F 17/30088 |
| | | | 707/649 |
| 2013/0060948 A1* | 3/2013 | Ulrich | G06F 17/30067 |
| | | | 709/226 |
| 2013/0262390 A1* | 10/2013 | Kumarasamy | H04L 41/08 |
| | | | 707/649 |
| 2014/0067887 A1* | 3/2014 | Schabengerger | G06F 17/302 |
| | | | 707/827 |
| 2014/0181039 A1* | 6/2014 | Harrison | G06F 17/30091 |
| | | | 707/652 |
| 2014/0215258 A1* | 7/2014 | Chen | G06F 11/0793 |
| | | | 714/4.3 |
| 2015/0112946 A1* | 4/2015 | Kao | G06F 11/1471 |
| | | | 707/654 |
| 2015/0213011 A1* | 7/2015 | George | G06F 17/303 |
| | | | 707/802 |
| 2015/0237137 A1* | 8/2015 | Dageville | G06F 9/5016 |
| | | | 709/213 |
| 2015/0347435 A1* | 12/2015 | Pavlov | G06F 17/30094 |
| | | | 707/652 |
| 2016/0006461 A1* | 1/2016 | Yin | G06F 11/1012 |
| | | | 714/766 |
| 2016/0021026 A1* | 1/2016 | Aron | H04L 47/821 |
| | | | 709/226 |

* cited by examiner

FAULT TOLERANT DISTRIBUTED TASKS USING DISTRIBUTED FILE SYSTEMS

BACKGROUND

Computing resource service providers and other large-scale users of computing resources often utilize configurable and scalable computing resources to meet various types of computing needs. A computing resource service provider, for example, is designed to share large amounts of computing resources and can be distributed among a large number of users, and may include multiple computing components configured to store and access data.

However, some of these computing components may fail from time to time and, if proper precautions have not been taken, the failure may result in temporary a loss of accessibility to some of the data stored on the computing resource service provider. As a result, when there is a failure, some applications or tasks that rely on access to data stored on the computing resource service provider may not operate properly while access to the data is being restored.

BRIEF DESCRIPTION OF THE DRAWINGS

Various embodiments in accordance with the present disclosure will be described with reference to the drawings, in which.

DETAILED DESCRIPTION

Figure 1:
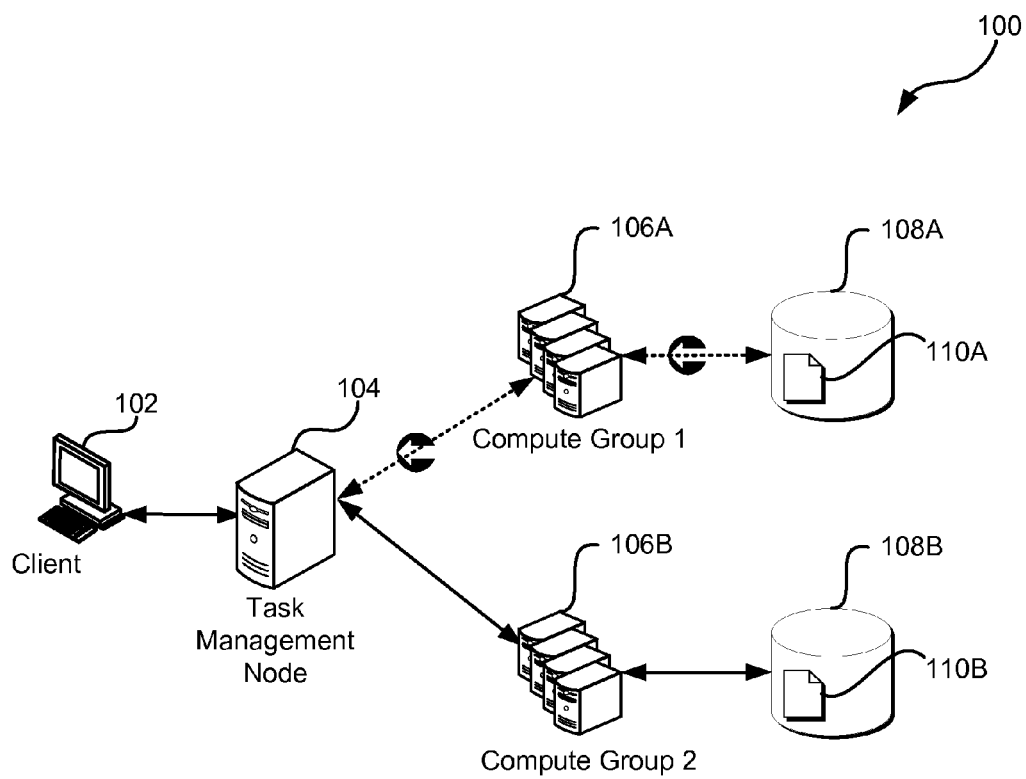
FIG. 1 illustrates an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include improvements to the performance and reliability of distributed tasks in a highly available distributed file system environment. The improvements are made through network topology-aware data and task management that increase reliability by isolating the redundant copies of data from failures and increase performance by distributing tasks among more computing resources. A distributed file system is connected to a network which may include intranet and Internet connections. The task data is replicated across the network by the data management node which uses a group-aware script to determine where to replicate the data. The group-aware script contains a mapping of compute zones to compute groups.

Compute zones are regions of computing resources logically and/or physically isolated from each other such that failures in one compute zone do not affect other compute zones. An example of a compute zone is an availability zone in the Amazon Web Services infrastructure. Compute nodes are logical groupings of computing resources that are connected by a low latency, high-throughput connection. Compute resources may include hardware components (such as servers, computers, and laptops), software components (such as virtual machine instances), or a combination of both hardware and software. Each compute node may be connected to every other compute node within a compute zone that allows for high performance intra-zone replication and access of data.

When a client submits a distributed task to the task management node, the task management node uses a distributed processing framework, such as Hadoop, to process the data. The management node receives the input task, divides it into smaller, parallelizable procedures and distributes the parallelizable procedures to the compute nodes with access to the task data. The compute nodes may then divide the procedures into smaller child-procedures, creating a multi-level tree structure. When a sub-procedure is completed, the result is passed back and used to complete the parent procedure. Thus, computing resources from multiple compute groups may be simultaneously utilized to compute the result of a distributed task, greatly increasing the performance of the data processing task and reducing the time to complete the task as compared to traditional, serialized procedures that cannot be parallelized.

As a result of having data in multiple compute zones, distributed tasks can continue running even when an entire compute zone fails. For example, when the task management node identifies a failure to a running task (e.g., due to a power outage, network failure, and/or hard drive failure), the data management node may identify a second compute group with the replicated data, and the task management node may restart, re-run, or resume the task on a compute instance in the second compute group. In one embodiment, the data management node replicates distributed task data three times such that two copies are stored in different compute nodes of the same compute zone and the third copy is stored in a different compute zone.

In some embodiments, the task management node is configured to enable migration of a running task from one compute node to another computer node in order to increase overall platform utilization. For example, while a distributed task is running on a first compute node on a first set of task data, the task management node may receive a request to run a second distributed task that requires access to a second set of task data only available on the first compute node. The task management node may record the system state, disk data, and/or configuration by creating a snapshot of the first compute node. The snapshot may then be transferred to the second compute node, where the snapshot may be used to change the execution state of the second compute node to match the state stored in the snapshot. This migration can allow for progress towards completion of the task made on the first compute node to be resumed on the second compute node.

FIG. 1 illustrates a computing resource service provider 100 in which various embodiments can be practiced. In this illustrative example, the environment includes a task management node that handles distributing the task submitted by the client 102, multiple compute groups 106 capable of performing distributed tasks, and a data node 108 connected to each compute node. The term "computing resource service provider" may be a distributed system that implements a platform for providing computing resources that are configurable and scalable to meet various types of computing needs. A computing resource service provider may be configured to share relatively large amounts of computing resources and can be distributed among a large number of users, and may include multiple computing components with configurable resources. In some embodiments, a distributed file system utilized by the computing resource service provider in providing services may also dynamically reallocate resources on demand.

For example, the client 102 may be a customer of a computing resource service provider composed of several configurable services such as virtual computing system service, networking services, storage services, database services, and so forth. The customer, through associated computing devices, can, through a remotely accessible application programming interface, such as a web service interface, scalably configure which services are used, how much of each resource is needed, how much to pay for a service, and more. The client may use the computing resource service provider to upload large collections of complex data, and executable instructions for processing/analyzing the data. Distributed tasks benefit greatly from the scalability of the computing resource service provider because they can quickly be scaled up or down to use resources based on the customer's needs.

The task management node 104 receives a distributed task from the client, and has one or more compute nodes perform the computational task. For example, in Hadoop, the management node may support MapReduce jobs. A MapReduce job includes a Map stage where the initial task is reduced into smaller sub-problems and distributed to multiple works in parallel, a Reduce stage where the answers to the sub-problems are collected and utilized to produce the result of the initial task. Upon receiving a MapReduce job, the management node may break up the job into several smaller tasks, run the tasks in parallel on separate compute nodes, and use the results from each task to compute the final job result.

T term "compute node" or "compute instance" may refer to a computing resource used in a computing resource service provider to execute a distributed task. A compute node can include computer hardware, computer software, and so forth. For example, a computer hardware server may an example of a compute node; additionally, a virtual machine instance running managed by a hypervisor and running within a computer hardware server is also an example of a compute node. As used herein, the terms "compute node" and "compute instance" are interchangeable.

As used herein, a "distributed task" is a specific type of computational task that can be processed in a parallel, distributed manner. A distributed task can be divided into subtasks, and the subtasks can be further distributed from a parent node to child nodes. The child nodes in turn may do this again, leading to multi-level delegation. Child nodes process the subtask and return the result to the parent node. These subtasks can be performed in parallel—for example, one compute node can be used per subtask, allowing for large numbers of compute nodes to be used in parallel to complete large, computationally expensive tasks. In some distributed tasks, the parent node may use the subtask results of the work performed by the child nodes and produce the task result requested of the parent node. For example, a Hadoop MapReduce job is a distributed task.

The compute group 106 (i.e., either of compute group 106A or 106B) comprises components capable of performing computational tasks, and includes both hardware components such as servers and software components such as virtual machine instances. Compute nodes may contain a combination of both hardware and software components. A typical example of a compute group includes multiple servers, each server capable of running one or more virtual machine instances which in turn are capable of running one or more computational tasks. The multiple servers may be located on several racks.

A virtual machine instance contains an operating system (e.g., Linux) and data needed to launch a virtual machine in a virtual environment. The virtual machine instance may include a file system, the operating system and other components needed to boot up as a computer. In order to launch a virtual machine, hardware needs to be selected. The hardware selection may be accomplished through instance types, which may allow a variety of different sizes of memory, CPU performance, GPU performance, storage capacity, and other characteristics. The combination of the virtual machine instance and the instance type can be used to create an "instance" or a virtual machine, which may be launched on a computing resource, such as a host server computer in a multi-tenant network environment (i.e., a computing environment where different virtual machines are managed by different customers and, in some embodiments, where individual hardware computer systems are used to implement virtual machines for multiple customers). As used herein, the terms "virtual machine" and virtual machine instance" are interchangeable.

Data nodes 108 capable of storing compute readable data 110 may be accessed by compute nodes as part of performing a computational task or portion of a computational task. Data nodes may, for example, comprise local storage accessible only to a specific hardware component in a compute node (e.g., a hard drive attached to a server) or may be network storage accessible by multiple hardware components in a compute node (e.g., a storage area network). In some embodiments, the compute node and data node may be the same component (e.g., a VMI may both perform computational tasks and store computer readable data). The term "data node" may refer to a node in a distributed file system which is used for storing file data (e.g., one or more file blocks for at least one file). For example, a DataNode in a Hadoop distributed file system (HDFS) may be considered an example of a data storage node.

As shown in FIG. 1, client 102 submits a distributed task that requires access to computer data 110 available in at least two data files 110A, 110B. The task management node 104 identifies that compute group 106A has access to the required data file 110A, submits the distributed task to compute group 106A to be run, the compute group runs the distributed task on a compute instance, and upon completion, returns the result.

However, in an embodiment, if the task management node 104 detects a failure, it will identify a second compute group 106B that has access to a second copy of the data file 110B and re-run the task on that compute node. The second compute group 106B may simply have a copy of the data file in the event of a failure of the first compute group 106A to access the data file or, in some embodiments, the second compute group may perform its own subtasks of a distributed task using its copy of the data file 110B. The failure may be in the data node itself (e.g., a hard drive failure), or may be components that are used in accessing the data node. For example, a network failure that disconnects compute group 106A or data node 108A, making the component inaccessible. If multiple compute nodes are able to access data file 110A, the task management node may use several factors (e.g., latency, server load) in identifying which compute node to re-run the job on.

Figure 2:
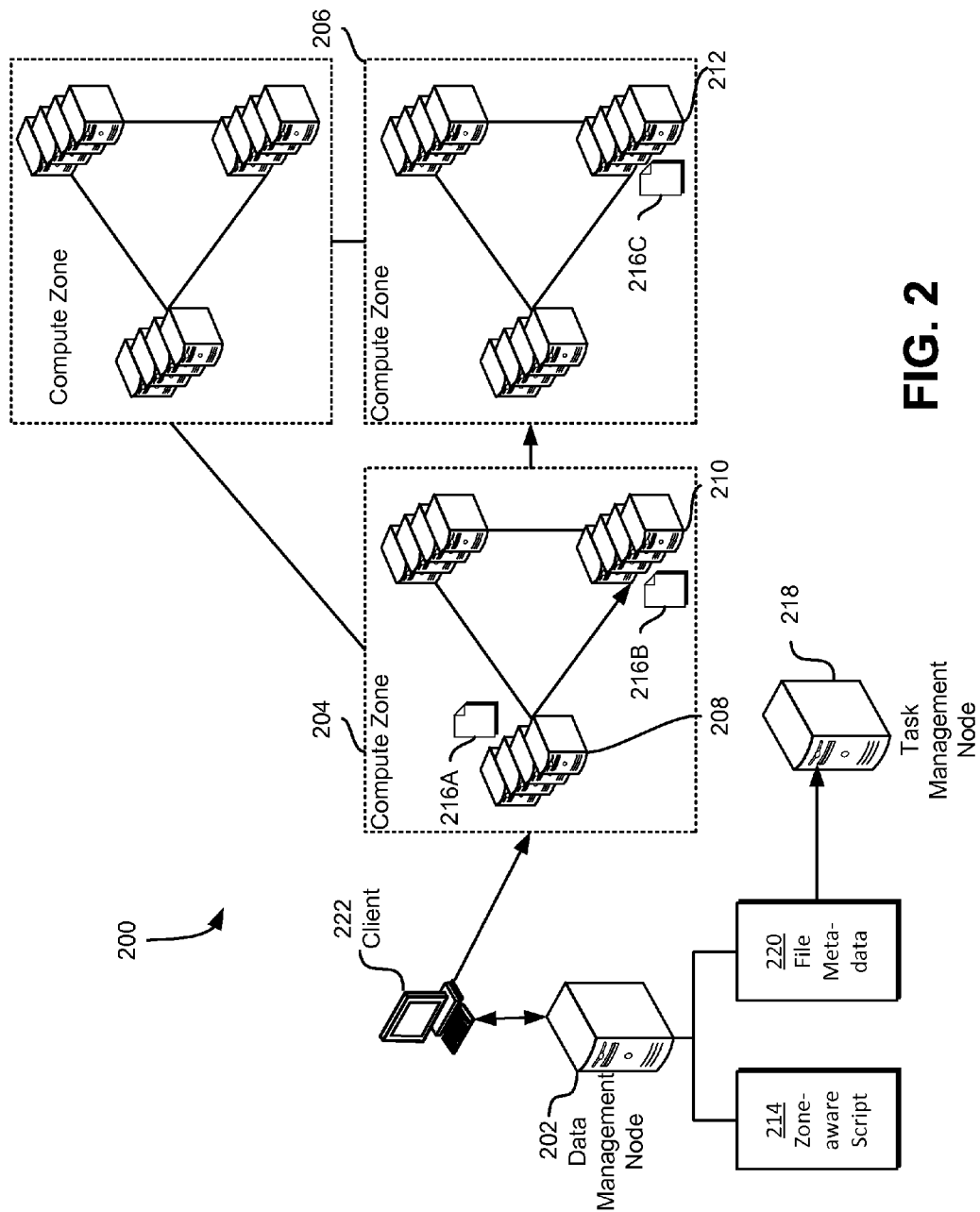
FIG. 2 illustrates a network topology and organization of the distributed file system of the invention in accordance with at least one embodiment.

FIG. 2 illustrates the network topology and organization of the distributed file system in which various embodiments may be practiced, including the embodiment illustrated in FIG. 1. The distributed file system environment 200 includes a data management node 202, at least two compute zones 204 and 206, and at least one compute group in each compute zone. For example, FIG. 2 shows three compute zones each having three compute groups, but other embodiments may have more or less compute groups in each compute zone.

The term "data management node" may refer to a node that stores and manages (e.g., updates existing entries, adds new entries, deletes entries, etc.) all the metadata information associated with the distributed file system. Examples of such metadata information may include directory tree information, file names, file blocks identification (file block IDs), file block location, file block mappings to IDs, file/block access permissions, file checksums, and more. For example, a NameNode in HDFS may be considered an example of a data management node. In some instances, a distributed file system may have multiple data storage nodes and a single data management node. The data management node may comprise suitable logic, circuitry, interfaces, and/or code and may be operable to data management-related functionalities within the distributed file system. For example, the data management node may be configured to read or write files and file blocks, replicate data, provide file streams, and so forth.

In this embodiment, the data management node 202 includes computer hardware that runs computer software for operating the distributed file system. The data management node contains a group-aware script 214 that contains a list of compute groups and, in some embodiments, a list of which compute group are in each compute zone. In other words, in some embodiments, the group-aware script is also a zone-aware script. The data management node may use the group-aware script to replicate a data file to data nodes that are isolated from one another against certain types of failure. For example, two redundant copies of a data file stored in geographically isolated data center rooms or even in geographically isolated data centers (e.g., located hundreds or thousands of miles apart) so that a fire or other event in one location housing a redundant copy of the data file may not affect a second redundant copy of the data file located in a second location.

The term "task management node" may refer to the node that schedule and manage (e.g., update existing entries, add new entries, delete entries, etc.) all the information associated with a distributed task processed by a computing resource service provider. Examples of such information may include which node contains the data needed by the task, the file block IDs of the files needed by the task, virtual machine instance configurations for what type of environment to run the task in (e.g., operating system, processor architecture, software, etc.), a specific node or set of nodes to run the task on, a maximum expense to be incurred for running the instance on, and so forth. For example, a JobTracker in Apache Hadoop is an example of a task management node. In some instances, a computing resource service provider may have multiple compute nodes and a single task management node. The task management node may comprise suitable logic, circuitry, interfaces, and/or code and may be operable to task management-related functionalities within the computing resource service provider. For example, the task management node may be configured to launch or terminate distributed tasks, configure or instantiate VMIs, and detect failure of compute nodes and launch replacement compute nodes and so forth.

The task management node may use the group-aware script to run a distributed task against redundant copies of file data. A group-aware script, as discussed in more detail below, may comprise information that specifies compute-groups and/or zones in which data is located. In some examples, the group-aware script comprises executable instructions for identifying zones in which data is located, although the scope of the present disclosure extend to embodiments where the group-aware script lacks executable instructions but otherwise indicates where data is located, such as by an index that associates identifiers of data with zones in which the data is stored. By having redundant copies of a data file in multiple compute groups, compute nodes from each of the multiple compute groups can be coordinated to assist in completing a distributed task using the data file.

Both the task management node and the data management node may use the group-aware script to perform the tasks it is responsible for in a way that allows for the task to be parallelized among multiple compute groups and to ensure the running of the task is resilient to failures. The data management node may be responsible for coordinating data upload and coordinating data replication. The task management node 218 may be responsible for detecting and optimizing compute resource utilization in the computing resource service provider detecting and preempting a task based on priority, detecting and recovering a task from a failure, detecting and handling task migration arising from a maintenance process.

The group-aware script 214, in an embodiment, defines the network topology of the distributed file system. The group-aware script contains a mapping of the compute group to compute zones. Each compute group must be part of exactly one compute zone. Although three compute zones and three compute groups are shown in FIG. 1, any number of compute groups and compute zones may be used in accordance with the present disclosure. The data management node uses the group-aware script to determine which set of data nodes to replicate data to. The task management node uses the group-aware script to determine which empty node to start a computational task submitted by the client, handle migration of a task when there a running node goes down unexpectedly, handle migration of a task in case a running node is going down for maintenance, and so forth.

A compute group (e.g., 208, 210, 212) is a logical grouping of compute instances. In some embodiments, a compute group is configured such that compute instances in the group satisfy one or more conditions on latency, bandwidth, and/or other resources. An example compute group is an placement group in the Amazon Web Services Elastic Compute Cloud (EC2) infrastructure. In this manner, in some embodiments, instances in a compute group are to participate in a low-latency, high-throughput connection with other instances in the group. Compute instances are computer hardware, computer software, or a combination of computer hardware and software capable of running computational tasks. Examples of compute instances are computer hardware servers, virtual machine instances, and a configuration of computer hardware servers, hypervisors, and virtual machine instances. Each compute instance is capable of running computational tasks such as data processing tasks and is capable of accessing data stored in a distributed file system. Compute instances are also capable of storing and retrieving computer data, which may be stored within a compute instance (e.g., on a physical hard drive attached to a server), or simply accessible from a compute instance (e.g., on an removable external hard drive or a storage area network (SAN)).

Thus, in various embodiments of the present disclosure, the instances within a compute group are able to communicate quickly with each other and also able to transfer and access data quickly between the instances. In an embodiment, the low latency, high-throughput connection includes a network where compute instances are directly (e.g., physically) connected to the same network switch and are part of the same local area network (LAN). In an embodiment, a compute group includes multiple racks of servers, each server running multiple virtual machine instances, each of which is a compute instance, wherein the servers are connected via a LAN connection and the servers within a rack are connected via a high-speed network switch. Compute groups may span several rooms and even span multiple data centers, provided that the instances are still able to communicate via a low latency, high-throughput connection. Compute groups within a compute zone can communicate with each other, although they do not necessarily have a low latency, high-throughput connection. In some embodiments, transferring data between two compute groups intra-zone will be more efficient than transferring data between compute zones.

A compute zone contains one or more compute groups. For example, compute zones 204 and 206 each contain three compute groups. Each compute zone is logically isolated from every other compute zone, such that isolated failures in one compute zone do not affect another compute zone. Compute zones may to achieve greater fault tolerance and stability by replicating data across compute zones, thereby ensuring that an isolated failure in one compute zone will not affect other replicated copies of the data. For example, a hard drive failure causing the loss of one copy of data may not affect other copies of data that may exist in other compute zones. Other examples of failures are network failures, computer crashes, hard drive failures, fires, and natural disaster. In each case, one or more compute groups within a compute zone may go down, or even the entire compute group may go down but other compute zones may be unaffected.

In an embodiment, compute zones may be configured to isolate against regional failures. Regional failures may include failures such as power outages and failures in a local networking switch or router that may cause compute instances within a region to be unavailable. In such a configuration, a data center depending on a local power source to operate may not span two compute zones because a failure in the local power source may cause the entire data center to fail. Furthermore, a configuration with a data center spanning two compute zones may not isolate the compute zones from other types of failures. In this example, a fire may destroy the entire data center, thus causing failures in all compute zones served by the data center.

In one embodiment, compute zones are configured such that compute zones are isolated from one another based on geographic location. In this configuration, the compute zones may be hundreds or thousands of miles apart, and may provide fault tolerance against small-scale local events such as local power outages, network failures, fires, and natural disasters.

Thus, having redundant copies of data in two compute zones protects the data from failure of a single location. Compute groups within a compute zone may be connected with low latency and/or high-throughput communications. Although communication between compute zones may not be as performant as inter-group communication, inter-zone communication is typically faster than communication between nodes in two different compute zones. Additionally, bandwidth between compute zones may be more expensive because compute zones may physically be long distances apart and/or require the use of additional network resources such as an internet service provider to facilitate inter-zone communications.

In the embodiment shown in FIG. 2, three copies of the file data 216 exist in the distributed file system. However, in other embodiments, there may be two copies, or more than three copies. Each copy of file data is accessible from compute instances within at least one compute group. The file copy 216A is accessible by compute instances within compute group 208. In some embodiments, file copy 216A may be accessible by more than one compute group in the compute zone, for example, where the data file is stored on a SAN the file copy 216A may be accessible from compute instances in other compute groups that are also connected to the SAN. The file data is stored such that two copies are stored in different compute groups of the same compute zone, and a third copy is stored in a second compute zone.

The term "distributed file system" may refer to a file system designed to hold a large amount of data, while providing high throughput access to the information. The files of the distributed file system may be stored in a redundant fashion across multiple nodes to ensure durability and performant access to data. In some instances a distributed file system may also be known as a network file system, using a network protocol to access the file data. Additionally, files may be divided into parts (called blocks), and the blocks may be stored in separate nodes across the distributed file system. The file blocks may be accessed using the same interfaces and semantics as when accessing local files (e.g., mounting/unmounting, listing directories, reading/writing at byte boundaries, setting permission, and more). Examples of distributed file systems may include the Google File System (GFS), the Apache Software Foundation's Hadoop Distributed File System (HDFS), Inktank's Ceph, the Moose File System (MooseFS), Windows Distributed File System (DFS), Fraunhofer Parallel File System (FhGFS or Fraunhofer FS), Red Hat's GlusterFS, Lustre, Ibrix, and so forth.

In the embodiment shown in FIG. 2, the file copy 216 is replicated from compute group 208 to compute group 210 (or vice versa) over a LAN connection. In addition, the compute groups may be located in the same data center and the data may be transferred exclusively using connections within the data center. As a result, the latency and transfer rates between compute groups 208 and 210 may be better than the latency and transfer rates between compute group 208 and another compute group (not shown in FIG. 2) that is located in another data center. The transfer of data between data centers may result in additional overhead to communications due to the use of additional communications infrastructure such as networking switches and optical fiber to connect one data center to another. Thus, the embodiment shown in FIG. 2 may be faster than a distributed file system that fairly distributes data across all data nodes (i.e., the distributed file system attempts to balance the storage used in each data node) or a distributed system that randomly distributes the data among data nodes.

In the embodiment shown in FIG. 2, compute groups 208, 210, and 212 may simultaneously process a distributed task requiring access to data file 216. In this configuration, compute instances in compute group 208 may use data file 216A to process the distributed task, compute instances in compute group 210 may use data file 216B to process the distributed task, etc. This configuration, in some embodiments, provides better performance characteristics than distributed file systems where the data is replicate data within the same compute group because this configuration enables compute instances from multiple groups to process the distributed task.

Additionally, the embodiment in FIG. 2 also has the advantage of high reliability. By ensuring that the data file is located in at least two compute zones, the data file may be resilient from a single failure because the compute zones are logically isolated from each other. Thus, even catastrophic events such as large scale network events and natural disasters might not sufficient to cause data loss of file 216.

The data management node 202, in an embodiment, includes file metadata 220 for the stored location of each data file 216. Each metadata entry will include information with the compute zone and compute group that the file data is stored in; when multiple copies of a file exist, the location of each copy is recorded. For example, data file 216 will have three entries-one for each for the copy of the file that exists on the distributed file system. The file metadata information is used by the task management node 218 deciding which empty node to start a computational task submitted by the client 222, when no empty nodes are available, determining whether to migrate a running task to make room for the submitted task, handling migration of a task when there a running node goes down unexpectedly, handling migration of a task in case a running node is going down for maintenance, and so forth.

Figure 3:
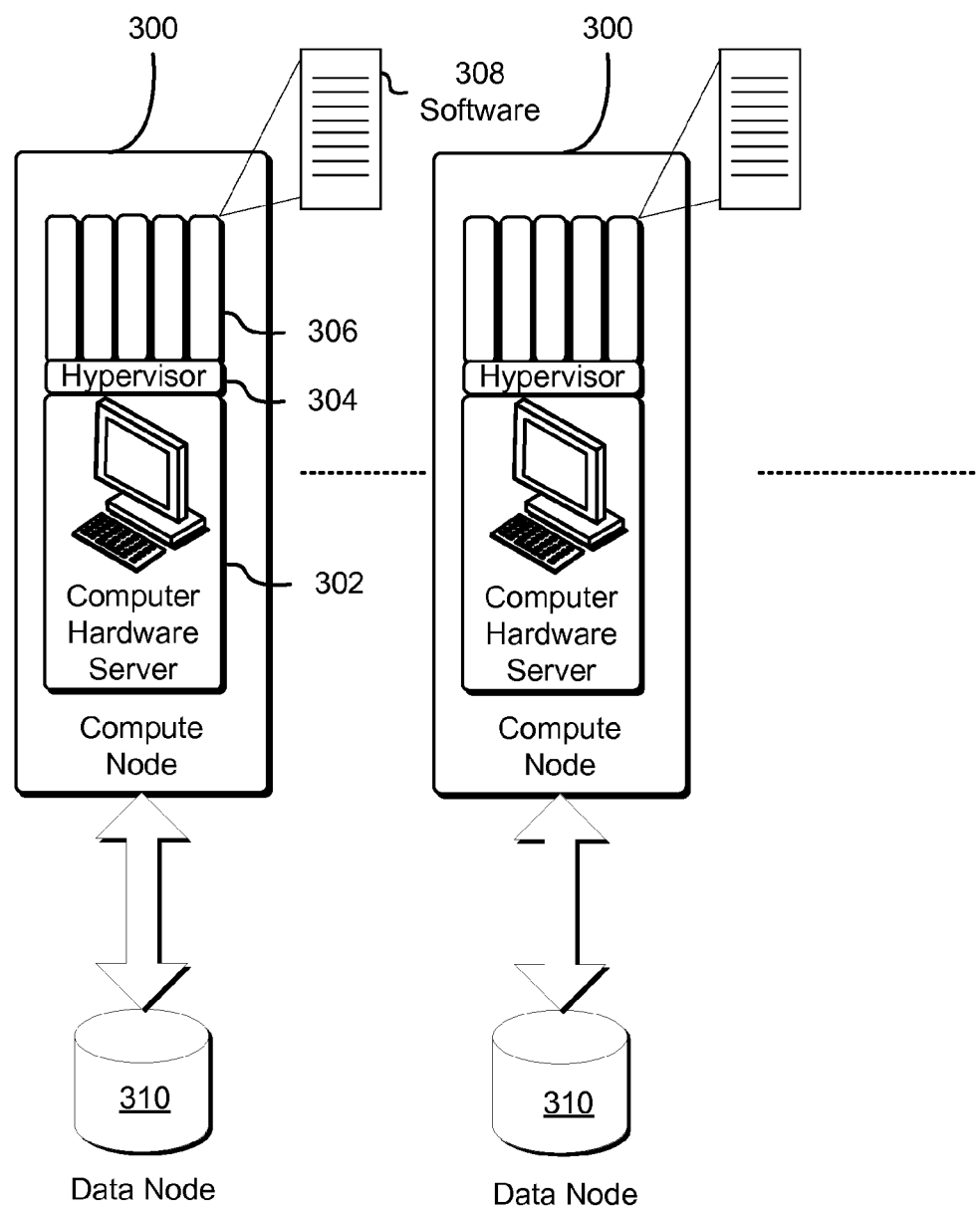
FIG. 3 illustrates an embodiment of a compute node configuration in accordance with at least one embodiment.

FIG. 3 illustrates an embodiment of a compute node configuration. In the presented embodiment, a compute node 300 includes multiple computer hardware servers 302. The computer hardware server contains a hypervisor 304 that is capable of creating and running virtual machine instances (VMIs) 306 and distributed file system software 308. Furthermore, the computer hardware server is capable of operating a data node 310.

The computer hardware server 302, in an embodiment, contains a hypervisor and software for running a distributed file system data node. The distributed file system software 308 is responsible for (i.e., when executed, causes) handling traditional file system operations such as read, write, and delete operations and in addition, the software may also be responsible for replicating stored data to another distributed file system data node. Data stored by the distributed file system may be complete files or portions of a file called file blocks. The file blocks of a complete file may be stored across multiple data nodes across the entire distributed file system.

The hypervisor 304 may be a piece of software, firmware, or hardware that is capable of creating and/or supporting virtual machine instances. The hypervisor may run directly on the host hardware server (a "bare metal" hypervisor) or run within a conventional operating system on the host hardware server (a "hosted" hypervisor). The hypervisor manages the execution of the virtual machine instances 306, which are used by the computing resource service provider to perform distributed tasks.

The virtual machine instance 306 is a software implementation of a computing environment or a computer system. The virtual machine instance emulates a real or hypothetical machine, and can be configured by the hypervisor to have specific CPU, GPU, memory, and storage configurations. Additionally, the virtual machine instance can be configured with operating systems and software. Virtual machine instances are used by the computing resource service provider to run data processing tasks.

Each compute node 300 can store and otherwise access computer data to a data node 310. The distributed file system software and virtual machine instances may use the data node to store data. The distributed file system software uses the data store to handle file system operations, and the virtual machine instances may use the data node as part of a translated operation. For example, when a virtual machine instance saves a file to a virtual hard disk, the saved file may be saved to a partition in the data node reserved for the virtual machine instance. Data nodes may be a component of the computer hardware server (e.g., a hard drive in the server) or may be accessible over a network. For instance, a data node may be a storage area network (SAN). Each data node is connected to at least one computer hardware server, although the data node may be attached to multiple servers, for example, a storage area network can be simultaneously attached to multiple computer hardware servers.

Figure 4:
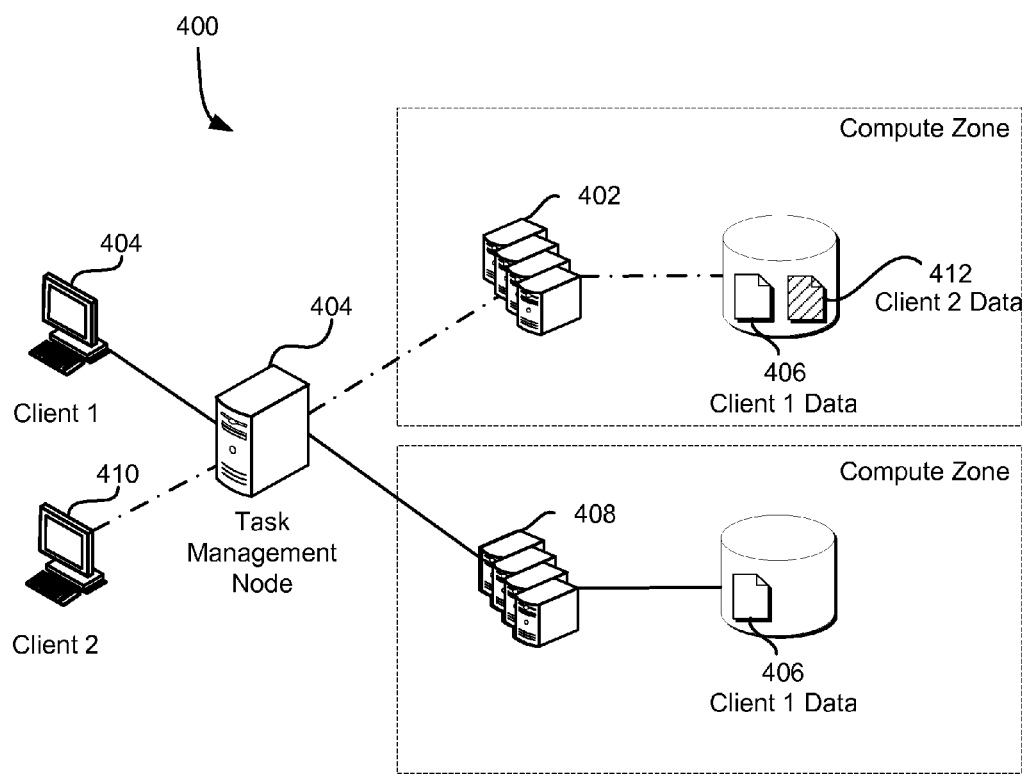
FIG. 4 illustrates an environment including a computing resource service provider executing multiple tasks in accordance with at least one embodiment.

FIG. 4 illustrates a computing resource service provider environment 400 with two tasks that both require data stored in compute group 402. Here, a first client 404 has submitted a distributed task that requires access to data 406 that is stored in compute groups 402 and 408 in separate compute zones, and a second client 410 has submitted a distributed task that requires access to data file 412 that has not been replicated and is only available from compute group 402. The task management node 404 schedules tasks such that if possible, both tasks will be processed. In this example, the task submitted by the first client will be processed in compute group 408 and the task submitted by the second will be processed in compute group 402.

In some cases, the first client's task may start running in compute group 402 but migrate to compute group 408. For example, if the first client submits its task before the second client, the task management node may assign the task to compute group 402—compute group 402 may have lower latency or lower operational cost compared to compute group 408. Alternatively, compute group 408 may not have been available when the first client submitted the task and only later became available. In this example, when the second client submits its task, the task management node may migrate the first client's task from compute group 402 to compute group 408 if it determines that the service increases overall processing throughput by processing the second client's task in compute group 402 and to migrating the first client's task to compute group 408. Additionally, the management node may determine it is favorable to process the second client's task on compute group 402 and to shutdown or pause the first client's task even when compute group 408 is unavailable (i.e., the second client's task preempts the first client's task). In yet other cases, the management node may migrate the first client's task from compute group 402 to compute group 408 (or suspend it entirely), process the second client's task on compute group 402, and migrate the first client's task back to compute group 402 from compute group 408 (or resume it from suspension).

Many factors may be used to determine whether a running task should be migrated off a compute instance in favor of another task. These factors include optimizing efficiency of computing resources, optimizing overall throughput of distributed tasks, reducing operational costs and so forth.

Figure 5:
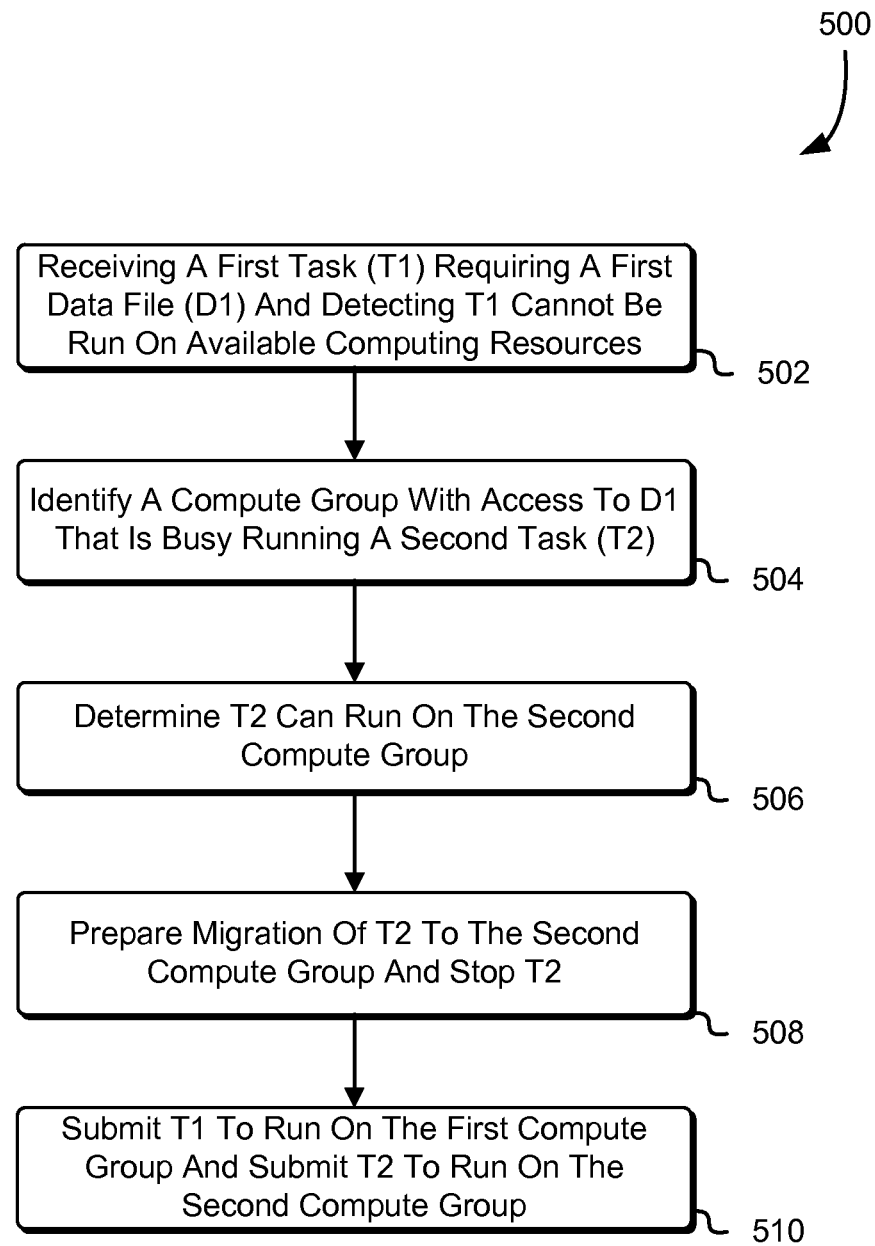
FIG. 5 is an illustrative process for migrating a task to increase the overall throughput of a computing resource service provider, in accordance with at least one embodiment.

FIG. 5 shows an illustrative example of the process 500 which may be used to migrate a task to increase overall efficiency of the computing resource service provider, in accordance with an embodiment of this disclosure. The process 500 may be performed by any suitable system or combination of systems such as a distributed system implemented in the environment described above in connection with FIG. 4, with various components of the environment performing operations such as described below. Returning to FIG. 5, in an embodiment, the process 500 includes the task management node receiving 502 a first distributed task requiring a data file and identifying 504 a compute group with access to the data file, but that is busy running another task and, generally, detecting that the first distributed task cannot be run on any available compute instances. For example, in the embodiment described in FIG. 4, the task management node may detect that the second client's task cannot run because the compute group 402 with access to the required data file 412 is processing the task previously submitted by the task management node 404.

Figure 6:
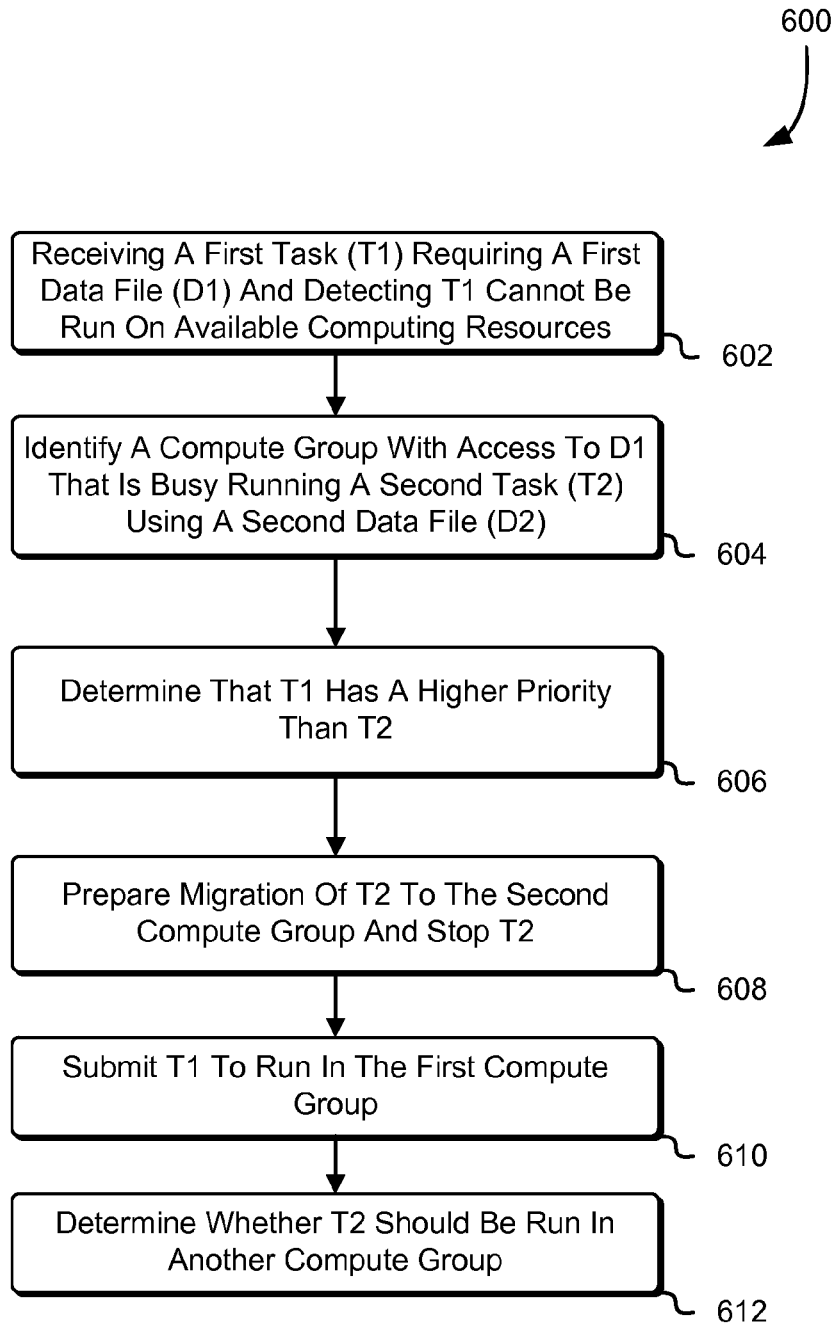
FIG. 6 is an illustrative process for preempting a task based on priority in an environment including a computing resource service provider, in accordance with at least one embodiment.

Upon detecting the distributed task cannot be run on the available computing resources, the task management node may query the data management node for the list of all compute groups where the data file is stored and check the availability of those compute groups. According to the embodiment described in FIG. 4, the compute groups with the required data file may be operational but unavailable due to processing other tasks. In other embodiments, the compute groups with the required data file might be unavailable due to a failure, in which task migration in accordance with FIG. 5 would not occur, although preemption in accordance with the process described in FIG. 6 is still possible.

Upon determining that at least one compute group with the required data file is operational but unavailable due to processing a second distributed tasks, the task management node may determine 506 whether the second task can be run on second compute group. In some embodiments, the second task may have specific requirements that must be satisfied by the second compute group. For example, the second compute group may require a minimum amount of CPU resources, or may require access to specific data. In some embodiments, there may be more than one compute group with the required data file that are operational but unavailable, in which case the same steps performed on the second distributed task are repeated for each of the additional distributed tasks.

In an embodiment, upon identifying 504 a second compute group suitable for processing the second distributed task, the task management node prepares 508 the task for migration. For example, the task management node may notify the compute instance running the second distributed task to prepare to migrate the task. In some embodiments, the compute instance will record a snapshot of the system (i.e., of the compute instance). A snapshot of the system may be a representation of the system that includes a system state stored in cache, memory, and/or persistent storage. In other embodiments, the compute instance may not record any system state at all. The system state may include data that enables restoration of execution the second distributed task at a later time on the same compute instance or on another compute instance. The system state may, for example, indicate preliminary calculations that have been made and identify data remaining to process. The task management node then stops the second distributed task. In some embodiments, the task management node will wait for the compute instance to acknowledge it has finished recording the snapshot.

Next, in an embodiment, the task management node submits 510 the first distributed task to the compute instance where the second distributed task was just stopped and submits the second distributed task to a compute instance in the second compute group previously found suitable for running the second distributed task. In some embodiments, a snapshot or other system state may accompany the submission of the second distributed task; in these embodiments, the system state is applied to the compute instance in the second compute group, restoring some or all progress made in the second distributed task. In other embodiments, no system state accompanies the submission of the second distributed task.

FIG. 6 shows an illustrative example of the process 600 for preempting a task based at least in part on priority in a computing resource service provider, in accordance with an embodiment of this disclosure. The process 600 may be performed by any suitable system or combination of systems such as the environment described above in connection with FIG. 4. Returning to FIG. 6, in an embodiment, the process 600 includes the task management node receiving 602 a first distributed task requiring a data file and detecting the first distributed task cannot be run on any available compute instances. For example, in the embodiment described in FIG. 4, the task management node may detect that the second client's task cannot run because the compute group 402 with access to the required data file 412 is processing the task previously submitted by the task management node 404.

Upon detecting the distributed task cannot be run on the available computing resources, the task management node may identify 604 a compute group with access to the data that is busy with another task. For instance, the task management node may query the data management node for the list of all compute groups where the data file is stored and check the availability of those compute groups.

Upon determining 604 that at least one compute group with the required data file is operational but unavailable due to processing a second distributed tasks, the task management node, in an embodiment, determines 606 that the first distributed task has a higher priority than the second distributed task. For example, the task management node may compare the priority of the second distributed task with the priority of the first distributed task. The priority of the tasks may be calculated based on factors which may include a bidding system where distributed tasks are assigned priority based on the price clients are willing to pay to have the task processed (i.e., tasks with a higher bid price will be given priority ahead of tasks with a lower bid price). However, evaluation methods may also include other factors, such as whether the client has reserved a specific compute node (giving that client's tasks higher priority over all other clients' tasks). Additional factors may include calculations based on how much computational time the second distributed task may lose by being preempted. For example, in a system that does not support saving system state, all migrated tasks will be restarted. In such a system, it may be more advantageous to allow a long-running task to run to completion rather than preempt it shortly before it is expected to finish). In another example, how long a particular task is expected to wait may also factor into the task's priority. For example, if the first distributed task is expected to wait a short while for a second copy of data 412 to become available (for example, from the completion of a scheduled maintenance) the first distributed task may not preempt a second distributed task if it was expected that the second distributed task would need to wait a long time to be run again.

Upon determining that the first task has a higher priority than the second task, the task management node may prepare 608 for migration of the second task to a different compute group. For example, the task management node may notify the compute instance running the second distributed task to prepare to migrate the task. In some embodiments, this will follow the same process as described in process method step 508 described above.

Upon stopping the second distributed task, the task management node may submit 610 the first distributed task to the newly freed compute instance. Additionally, the task management node may determine 612 the second task should be run on another computer group and, if so determined, attempt to submit the second distributed task to run. In some embodiments, submitting the second distributed task to run may result in a second preemption or may result in a migration as described above in FIG. 5.

Figure 7:
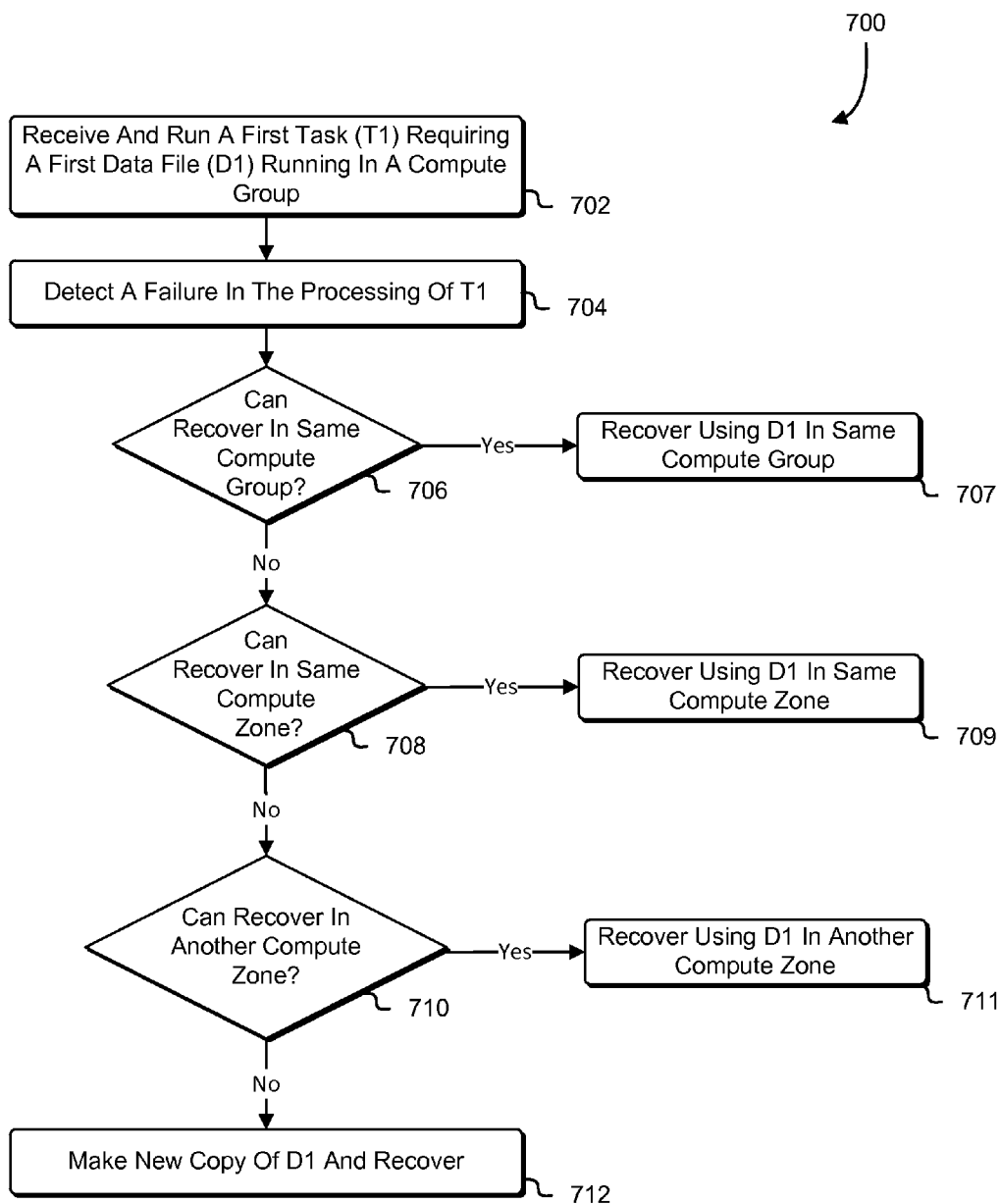
FIG. 7 is an illustrative process for handling recovery of a task in response to a data node failing, in accordance with at least one embodiment.

FIG. 7 shows an illustrative example of the process 700 for recovering from a failure in accordance with an embodiment of this disclosure. The process 700 may be performed by any suitable system or combination of systems such as the environment described above in connection with FIG. 4 and as described in more detail below. Returning to FIG. 7, in an embodiment, the process 700 includes the task management node receiving 702 a distributed task requiring a data file and executing the distributed task on a compute instance meeting the requirements of the distributed task which may include access to a data file, CPU requirements, and so forth. For example, in the embodiment described in FIG. 4, the task management node may execute a distributed task requiring data file 412 on a compute instance in compute group 402.

After the distributed task has begun execution on the compute instance and before it reaches completion, the task management node may detect 702 that the compute node running the task is in an error state. In an embodiment, the error state may be a failure that causes the task to stop completely, for example, due to a failure on a particular piece of hardware (e.g., CPU, fan, hard drive) on a server. In other embodiments, the error state may be a failure that causes the task to run slower, for example, due to the overloading of a network connection.

Next, in an embodiment, the task management node attempts to recover the task within the same compute group by first determining 706 whether recovery is possible (e.g., possible to comply with any conditions on the distributed system in force) in the same compute group and, if so, recovering 707 in the same compute group. If not possible, the task management node may determine 708 whether recovery is possible within the same zone and, if so, recovering 709 within the same zone but within a different compute group. If not possible, the task management node may determine 710 whether recovery is possible in another zone and, if so, recovering 711 in another zone. In an embodiment, to determine whether recovery is possible within the same group, the task management group queries the data management node for the location of the compute node running the task, including at least the compute group and compute zone that the node is part of Re-running the distributed task in the same compute group is most favored because the task may communicate with other compute instances in the same group that are participating in the same Map or Reduce procedures. Since these procedures may be passing results between the parent and child tasks, in some embodiments, it is preferable to run the procedures within compute instance of the same compute group, utilizing the low latency, high-throughput connection between the compute nodes.

As noted, in an embodiment where the recovery fails in step 706, the task management node attempts to recover the task within a second compute group in the same compute zone that has data 412. Re-running the distributed task in the same compute zone is, in some embodiments, favorable to re-running the distributed task in a second compute zone because data transfer between compute instances in the same compute zone may have lower latency and/or higher throughput compared to data transfer between compute instances in two different compute zones. Additionally, many of the same properties that are shared by one compute group in a compute zone—for example, lower latency due to physical proximity—may also be shared by other compute groups in the same compute zone.

In an embodiment where the recovery fails in step 708, the task management node attempts to recover the task within a second compute zone. This, in some examples, is less preferable than the previously described steps 706 and 708 because there are fewer advantageous properties that may be shared between compute instances in separate compute zones. Compute zones are logically isolated from each other, meaning that properties such as physical proximity to the client may not be shared between compute zones. If recovery in a second zone is not possible, the task management node may, at a later time, when recovery is available, make 712 a new copy of the data and recover in the same compute group and/or zone.

Figure 8:
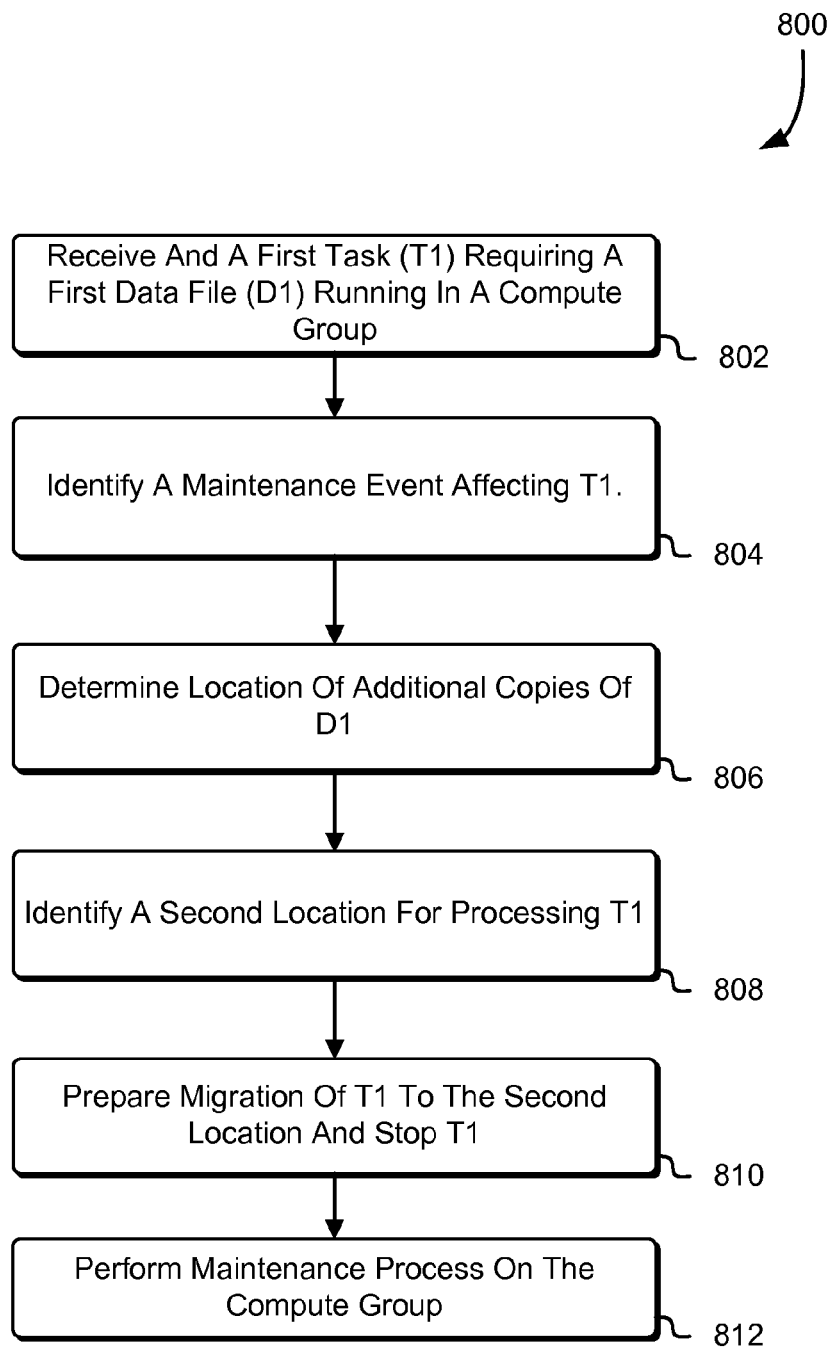
FIG. 8 is an illustrative process for migrating a task to accommodate a maintenance process in an environment including a computing resource service provider, in accordance with at least one embodiment.

FIG. 8 shows an illustrative example of the process 800 by which a distributed task is migrated due to a maintenance process, in accordance with an embodiment of this disclosure. The process 800 may be performed by any suitable system or combination of systems such as the environment described above in connection with FIG. 4 and by specific components, such as described below. Returning to FIG. 8, in an embodiment, the process 800 includes the task management node receiving 802 a distributed task requiring a data file and executing the distributed task on a compute instance meeting the requirements of the distributed task which may include access to a data file, CPU requirements, and so forth. For example, in the embodiment described in FIG. 4, the task management node may execute a distributed task requiring data file 412 on a compute instance in compute group 402.

After the distributed task has begun execution on the compute instance and before it reaches completion, the task management node may detect 804 that the compute node running the task must be shut down—for example, due to a scheduled maintenance or upgrade. Upon detecting the maintenance event, the task management group determines a location of an additional copy of the data file, for example, by querying the data management node for the location of the compute node running the task, including at least the compute group and compute zone that the node is part of. Next, the task management node identifies 806 a location (based on compute group and compute zone) for where to resume the task. The task management node may take several factors into account when determining where to resume the task. As an example, the task management node may determine that an available compute instance in the same compute group should not be used when the maintenance is expected to shutdown the entire compute group. Next, the task management node may identify a second location for executing the task. The task management node may prepare 810 for migration of the task, such as by taking a snapshot of the system state and migrate the distributed task to a compute instance in the location identified in 806. Finally, the maintenance process is performed 812 on at least the compute group 402.

Figure 9:
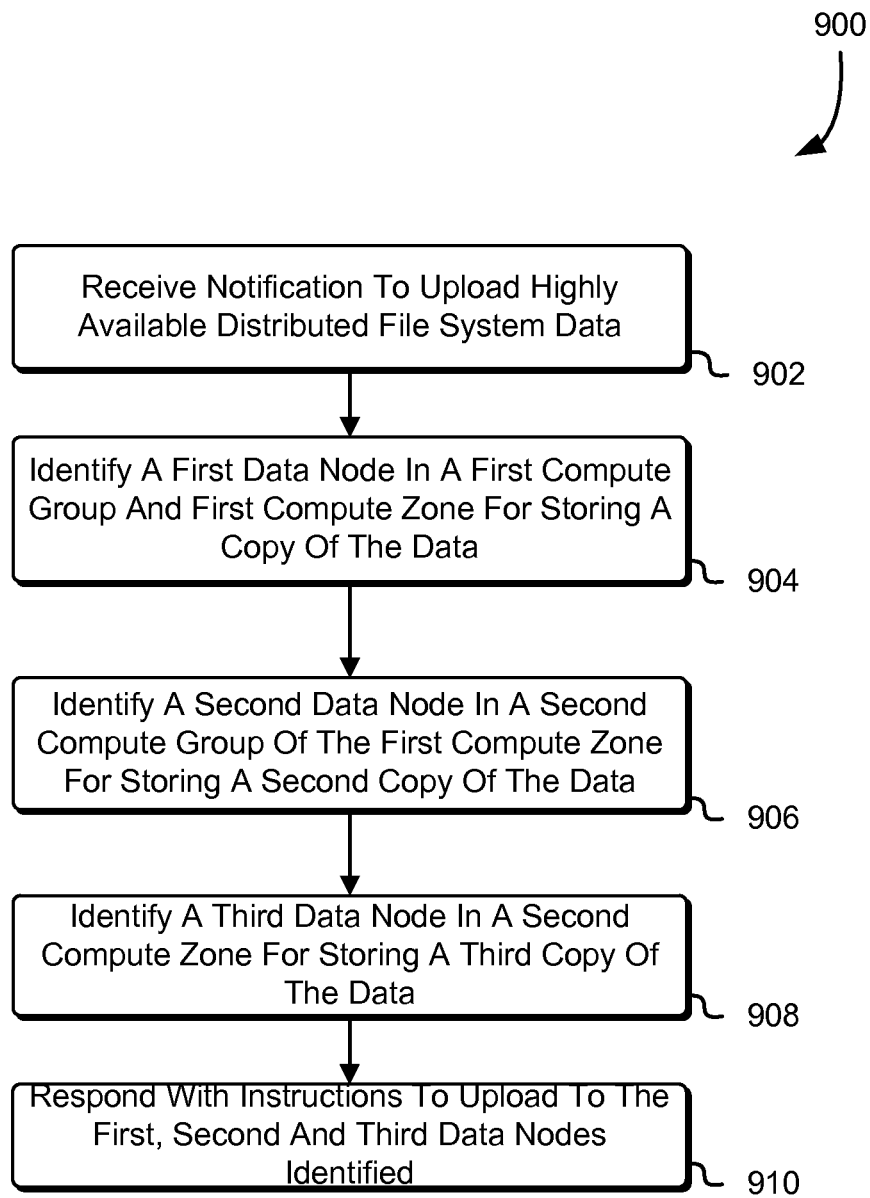
FIG. 9 is an illustrative process for replicating data in a distributed file system environment, in accordance with at least one embodiment.

FIG. 9 shows an illustrative example of the process 900 which may be used to replicate a data file in a distributed file system, in accordance with an embodiment of this disclosure. The process 900 may be performed by any suitable system or combination of systems such as one or more components of the environment described above in connection with FIG. 2. Returning to FIG. 9, in an embodiment, the process 900 includes the data management node 202 receives a notification 902 that a client wants to upload a data file to the distributed file system and that the client wants the data file to be highly available. In an embodiment, the data management node uses the group-aware aware script 214 to identify three data nodes to save the data to in 904, 906, 908—the nodes are chosen such that two nodes are located in different compute groups 208 and 210 in the same compute zone 204 and the third data node is located in a separate compute zone 206. However, other such embodiments may use more than three nodes. In an embodiment described by FIG. 2, the data nodes in the same compute zone transferred over optical fibers on a LAN network between the nodes handling datasets which may be as large as hundreds of terabytes or petabytes.

The management node responds 910 to the client with instructions for uploading the data file. In response to the message, the client uploads the data file 212 to the platform. In the embodiment shown in FIG. 2, the client uploads a single copy of the data file 212 to a first data management node 202 and the platform performs the data replication process internally. However, in other embodiments, the client may perform data replication by uploading to the data file to data nodes 206A, 206B, and 206C. In yet other embodiments, the replication can be done by both the client and the platform—for example, the client may upload the data file only once per compute zone and the platform replicates the data file within the compute zone, taking advantage of low-latency, high-throughput network connections that exist within the compute zone, whereas the client may replicate the data file to multiple compute zones because inter-compute zone data transfer may not have the same advantages as intra-compute zone data transfer (e.g., latency, throughput).

Figure 10:
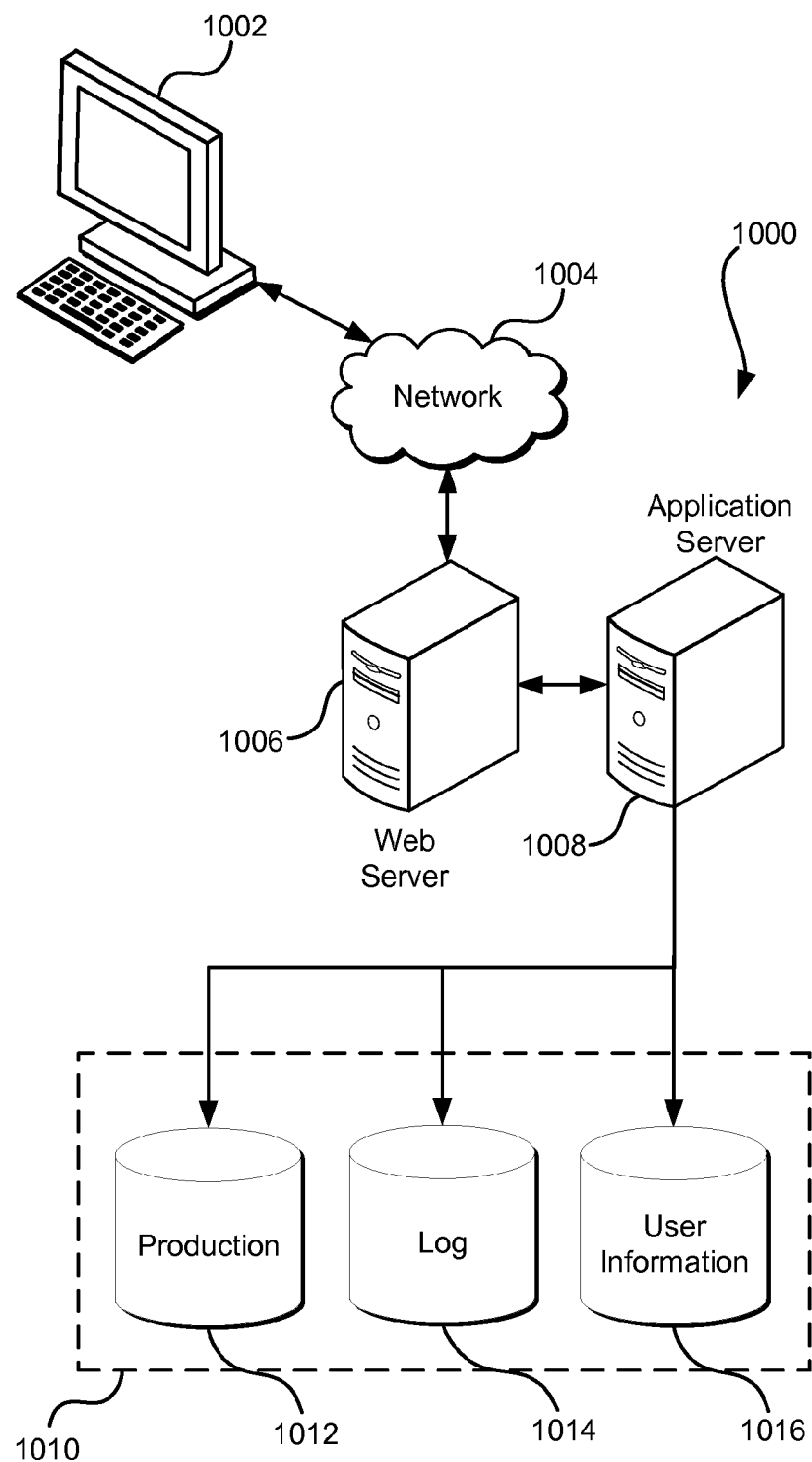
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
   a first mapping of compute zones to compute groups, each compute group of the compute groups being a logical grouping of compute instances;
   a second mapping of data nodes to the compute groups, each data node of the data nodes being associated with a file system that is isolated from file systems of other compute zones; and
   memory to store computer-executable instructions that, if executed by one or more processors, cause the system to:
      replicate, based at least in part on the first mapping and the second mapping, a data file to a plurality of the data nodes to make at least one copy of the data file accessible to a subset of the compute groups, the subset comprising a first compute group and a second compute group, wherein the first compute group is isolated from the second compute group;
      cause a distributed task to be executed by compute instances of the subset of the compute groups;
      detect a failure of a distributed task; and
      redistribute the distributed task among the subset of the compute groups such that at least one compute instance has access to the at least one copy of the data file.

2. The system of claim 1, wherein the first compute group is in a first compute zone that is isolated from the second compute group, the second compute group being in a second compute zone that is in a different physical geographic location from the second compute zone.

3. The system of claim 1, wherein the computer-executable instructions that cause the system redistribute further cause the system to identify, based at least in part on the first mapping and the second mapping, the subset of the compute groups, the first mapping including a network topology.

4. The system of claim 1, wherein the computer-executable instructions that cause the system to redistribute the distributed task further cause the system to:
   identify a set of subtasks of the distributed task that were performed on the data file by a particular compute group using a particular data node for which failure was detected; and
   redeploy the set of subtasks to the subset of the compute groups.

5. A computer-implemented method, the method comprising:
   monitoring accessibility of at least one copy of a data file made available to a subset of a plurality of compute groups, wherein the at least one copy was produced by replicating the data file to a plurality of data nodes, each data node of the plurality of data nodes being associated with a file system that is isolated from file systems of other compute groups, and wherein the subset comprises a first compute group and a second compute group, and the first compute group is isolated from the second compute group;
   detecting a failure of a distributed task that is dependent upon the at least one copy of the data file; and
   redistributing the distributed task among the subset of the plurality of compute groups such that at least one compute instance has access to at least one copy of the data file.

6. The computer-implemented method of claim 5, wherein the first compute group is in a first compute zone and the second compute group is in a second compute zone, and the first compute zone is isolated from a regional failure that affects the second compute zone.

7. The computer-implemented method of claim 5, wherein:
   the first compute group is in a first compute zone and the second compute group is in a second compute zone; and
   the subset of the plurality of compute groups also includes a third compute group in the first compute zone, and wherein the first compute group and the third compute group are connected via a local area network.

8. The computer-implemented method of claim 5, wherein the data file has been replicated by using information that specifies availability of the data file by different compute groups to identify the compute groups.

9. The computer-implemented method of claim 5, further comprising executing the distributed task by the at least one compute instance of the subset of the plurality of the compute groups by executing a plurality of subtasks, wherein a first subtask is performed in a first compute zone and a second subtask is performed in a second compute zone.

10. The computer-implemented method of claim 5, wherein the redistributing includes using information that specifies availability of the data file by different compute groups to select the first compute group and the second compute group.

11. The computer-implemented method of claim 5, wherein the redistributing includes providing a snapshot of a system state of a particular compute instance executing the distributed task when the failure was detected.

12. The computer-implemented method of claim 5, wherein the redistributing includes identifying a set of subtasks of the distributed task, for which failure was detected, that were performed on the data file by a particular compute group using a particular data node and redeploying the set of subtasks to the subset of the plurality of compute groups.

13. A non-transitory computer-readable storage medium having that stores executable instructions that, if executed by one or more processors of a computer system, cause the computer system to at least:
   coordinate replication of a data file to a plurality of data nodes, each data node of the plurality of data nodes being associated with a file system that is isolated from file systems of other compute groups, wherein the plurality of data nodes makes at least one copy of the data file available to at least one compute instance within a subset of a plurality of compute groups;

monitor the availability of copies of the data file in the plurality of data nodes to the plurality of compute groups;

detect a failure of a distributed task executing on a first compute instance in a respective compute group;

obtain a group-aware script that includes a mapping of compute zones to compute groups and a mapping of data nodes to a plurality of compute groups, each compute group of the plurality of compute groups being a logical grouping of compute instances; and redistribute, in accordance with the group-aware script, the distributed task from the first compute instance to a second compute instance in the subset of the plurality of compute groups, the second compute instance having access to a copy of the data file.

14. The non-transitory computer-readable storage medium of claim 13, wherein the plurality of compute groups includes a first compute group and a second compute group that are isolated from each other based at least in part on physical geography.

15. The non-transitory computer-readable storage medium of claim 14, wherein compute instances in the first compute group and compute instances in a third compute group of the plurality of compute groups are in first compute zone and connected via a local area network.

16. The non-transitory computer-readable storage medium of claim 14, wherein the executable instructions that cause the replication of the data file utilize information that specifies accessibility of the data file by compute groups to select the first compute group and the second compute group.

17. The non-transitory computer-readable storage medium of claim 13, wherein the executable instructions further include executable instructions that cause the distributed task to be executed by compute instances of the subset of the plurality of the compute groups by distributing a plurality of subtasks among compute instances in a plurality of compute zones.

18. The non-transitory computer-readable storage medium of claim 13, wherein the executable instructions that cause the computer system to redistribute the distributed task further cause the computer system to identify the compute groups by using information that specifies accessibility of the copies of the data file by the compute groups.

19. The non-transitory computer-readable storage medium of claim 13, wherein the executable instructions that cause the computer system to redistribute the distributed task further cause the computer system to utilize a system state of the first compute instance, obtained prior to detection of the failure.

20. The non-transitory computer-readable storage medium of claim 13, wherein the executable instructions that cause the computer system to redistribute the distributed task further cause the computer system to:
   identify a set of subtasks of the distributed task for which failure was detected; and
   redeploy the set of subtasks.

* * * * *